(12) United States Patent
Park et al.

(10) Patent No.: US 9,329,438 B2
(45) Date of Patent: May 3, 2016

(54) LIQUID CRYSTAL DISPLAY

(71) Applicant: SAMSUNG DISPLAY CO., LTD., Yongin, Gyeonggi-Do (KR)

(72) Inventors: Ju-Yong Park, Asan-si (KR); Ji-Young Jeong, Cheonan-si (KR); Jae-Ho Lee, Cheonan-si (KR); Eung-Gyu Lee, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 267 days.

(21) Appl. No.: 13/921,641

(22) Filed: Jun. 19, 2013

(65) Prior Publication Data

US 2013/0278879 A1  Oct. 24, 2013

Related U.S. Application Data

(62) Division of application No. 13/044,143, filed on Mar. 9, 2011, now abandoned.

(30) Foreign Application Priority Data

Oct. 28, 2010  (KR) .......................... 10-2010-0106264

(51) Int. Cl.
G02F 1/1339  (2006.01)
(52) U.S. Cl.
CPC ........ G02F 1/13392 (2013.01); G02F 1/13394 (2013.01)
(58) Field of Classification Search
CPC .................................................. G02F 1/13392
USPC ........................................ 349/155, 156, 157
See application file for complete search history.

(56) References Cited

U.S. PATENT DOCUMENTS

| 7,609,357 | B2 | 10/2009 | Kim |
| 7,623,212 | B2 | 11/2009 | Lee |
| 7,636,147 | B2 | 12/2009 | Lee |
| 7,684,003 | B2 * | 3/2010 | Paik et al. |
| 2005/0179853 | A1 * | 8/2005 | Chen et al. ..................... 349/155 |
| 2005/0264723 | A1 * | 12/2005 | Lee ................. 349/110 |
| 2007/0064186 | A1 * | 3/2007 | Son et al. ..................... 349/127 |
| 2007/0184367 | A1 * | 8/2007 | Kim et al. ..................... 430/20 |
| 2009/0104725 | A1 * | 4/2009 | Paik et al. ..................... 438/30 |
| 2009/0258451 | A1 | 10/2009 | Kim et al. |

FOREIGN PATENT DOCUMENTS

| JP | 2002-350861 | 12/2002 |
| JP | 2006-300975 | 11/2006 |
| KR | 1020030031842 | 4/2003 |
| KR | 1020050090035 | 9/2005 |
| KR | 1020060000279 | 1/2006 |

(Continued)

*Primary Examiner* — Edward Glick
*Assistant Examiner* — Anthony G Quash
(74) *Attorney, Agent, or Firm* — Innovation Counsel LLP

(57) ABSTRACT

The present invention relates to a liquid crystal display. The liquid crystal display includes a first substrate and a second substrate, the second substrate apposite the first substrate, a liquid crystal layer positioned between the first substrate and the second substrate, a spacer formed between the first substrate and the second substrate, the spacer contacting a first region of the first substrate and a second region of the second substrate. The first substrate has a groove including a first groove surrounding an outer boundary of the first region and a second groove surrounding the first groove.

20 Claims, 15 Drawing Sheets

(56) References Cited

FOREIGN PATENT DOCUMENTS

| KR | 1020060070873 | 6/2006 |
|---|---|---|
| KR | 10-658544 | 11/2006 |
| KR | 1020070034270 | 3/2007 |
| KR | 10-0710175 | 4/2007 |
| KR | 1020070072318 | 7/2007 |
| KR | 1020070079836 | 8/2007 |
| KR | 1020080043968 | 5/2008 |
| KR | 1020080082086 | 9/2008 |
| WO | 2008/120492 | 10/2008 |

* cited by examiner

LIQUID CRYSTAL DISPLAY

CROSS-REFERENCE TO RELATED APPLICATION

This application is a divisional application of U.S. patent application Ser. No. 13/044,143 filed on Mar. 9, 2011, which claims priority to, and the benefit of, Korean Patent Application No. 10-2010-0106264 filed in the Korean Intellectual Property Office on Oct. 28, 2010, the entire contents of which are incorporated herein by reference.

BACKGROUND OF THE INVENTION (a) Field of the Invention

Embodiments of the present invention relate generally to flat panel displays. More specifically, embodiments of the present invention relate to a liquid crystal display and a method for manufacturing the same.

(b) Description of the Related Art

Liquid crystal displays are one flat panel display technology that has found wide acceptance. Typical liquid crystal displays include two sheets of display panels on which electric field generating electrodes, such as pixel electrodes and common electrodes, are formed. A liquid crystal layer is inserted between the display panels. Liquid crystal displays generate an electric field in the liquid crystal layer by applying a voltage to the electric field generating electrode, determining the directions of the liquid crystal molecules via the resulting electric field, and displaying an image by controlling polarization of incident light.

A predetermined cell gap is preferably maintained between the two display panels, and for this, active spacers can be used. Bead spacers and column spacers can be used as the active spacer.

Bead spacers are advantageous in that they can be produced by s simple process and are thus relatively easy to manufacture. However, bead spacers often float within liquid crystal, and thus move with the liquid crystal during injection. If the bead spacers are moved sufficiently far, they may press against an alignment layer, causing undesirable light leakage. Alternatively (though somewhat rarely), the column spacers may instead be formed by photolithography, such that they are fixed at desired positions. However, these column spacers have smaller elastic strength as well as smear characteristics, such that the panel may be stained due to collapse of the column spacers or the lower layer when large pressure is applied to the liquid crystal display.

Everyday use, accidental impacts, and simple atmospheric pressure can result in forces applied to liquid crystal displays. These forces can be vertical loads, or two- or three-dimensional loads with both vertical and horizontal components.

When a sufficiently large vertical (i.e., normal to the face of the display screen) load is applied, the column spacers may be plastically deformed, and may fail to recover their original shape after the load is removed. This may result in permanent depressions in the display, where the liquid crystal layer is thinner than in other areas, in turn resulting in local luminance differences.

When a three-dimensional load is applied, the column spacers may slide, moving to an active region. When this happens, the alignment layer of the active region may be damaged and/or stained.

Further, when a three-dimensional load is applied, the column spacers may fail to return to the initial positions and cell gaps may be changed by the movement of the column spacers, even if the alignment layer is not damaged. Stains may be seen in the panel, as regions with different cell gaps display different luminances.

The above information disclosed in this Background section is only for enhancement of understanding of the background of the invention, and thus may contain information not in the prior art.

SUMMARY OF THE INVENTION

Embodiments of the present invention provide a liquid crystal display including spacers that can more effectively prevent a stain phenomenon due to external loading.

An exemplary embodiment of the present invention provides a liquid crystal display including: a first substrate and a second substrate; a liquid crystal layer positioned between the first substrate and the second substrate; a spacer formed on the second substrate; and an opposite portion positioned to correspond to the spacer, in which the spacer has a first surface facing the first substrate, the opposite portion has an opposite region including an opposite surface facing the first surface, and a groove generally forming an outer boundary of the opposite region, and the area of the opposite region is larger than that of the first surface.

A width of the groove may be smaller than that of the first surface.

The spacer may be formed in a non-display area.

The groove may be formed to surround the opposite region.

The opposite region may be shaped as any one of a circle, an ellipse, and a polygon.

The first surface may be shaped as any one of a circle, an ellipse, and a polygon.

The diameter or the width of the opposite region may be from about 5 to about 40 um.

The depth of the groove may be from about 0.01 to about 3 um.

The groove may include a first groove and a second groove, the first and second grooves having differing depths.

The first groove may be positioned closer to the opposite region than the second groove, and the depth of the second groove may be larger than that of the first groove.

The difference between the depth of the first groove and the depth of the second groove may be from about 0.01 to about 3 um.

The first substrate may be a thin film transistor substrate and the second substrate may be a color filter substrate.

The liquid crystal display may further include: a gate line and a data line disposed on the first substrate; a thin film transistor connected to the gate line and the data line; and a passivation layer formed on the thin film transistor, in which the groove may be formed in the passivation layer.

The liquid crystal display may further include a color filter formed on the second substrate, in which the spacer may be formed on the color filter.

The spacer may be formed to at least partially overlap the thin film transistor.

The spacer may be formed to at least partially overlap at least one of the data line and the gate line.

The liquid crystal display may further include a metal layer formed on the first substrate, and an insulating layer at least partially covering the metal layer, in which the groove may be formed on the metal layer and a step may be formed over the groove on the insulating layer.

The metal layer may be a gate conductor or a data conductor.

The spacer may be a main spacer formed to contact the first substrate, or a sub-spacer disposed at a predetermined distance from the first substrate.

Another exemplary embodiment of the present invention provides a method of manufacturing a liquid crystal display which includes: forming a spacer on a second substrate; forming an opposite portion on a first substrate, the opposite portion positioned to correspond to the spacer; and inserting a liquid crystal layer between the first substrate and the second substrate, in which the spacer has a first surface facing the first substrate, the opposite portion has an opposite region having an opposite surface being in contact with the first surface, the forming of an opposite portion includes forming a groove generally along an outer boundary of the opposite region, and an area of the opposite region is larger than that of the first surface.

A width of the groove may be smaller than that of the first surface.

The groove may be formed to surround the opposite region.

The forming of the opposite portion may further include: forming a gate line and a data line on the first substrate; forming a thin film transistor connected to the gate line and the data line; forming a passivation layer on the thin film transistor; and forming the opposite portion on the passivation layer.

The forming of the spacer may further include: forming a light blocking member and a color filter on the second substrate; and forming the spacer on the light blocking member and the color filter.

The spacer may be formed to at least partially overlap the thin film transistor.

The spacer may be formed to at least partially overlap at least one of the gate line and the data line.

Yet another exemplary embodiment of the present invention provides a liquid crystal display including: a first insulation substrate; a gate line formed on the first insulation substrate; a data line formed on the first insulation substrate and intersecting the gate line; a thin film transistor electrically connected to the gate line and the data line; a passivation layer at least partially covering the gate line, the data line, and the thin film transistor, the passivation layer having a contact hole exposing a portion of the thin film transistor, and a groove pattern formed therein, the groove pattern having a depth less than or equal to a depth of the contact hole; a pixel electrode electrically connected to the portion of the thin film transistor which is exposed by the contact hole; a second insulation substrate facing the first insulation substrate; a spacer formed on the second insulation substrate and maintaining a distance between the first insulation substrate and the second insulation substrate; and a liquid crystal layer positioned between the first insulation substrate and the second insulation substrate, in which the spacer is positioned within the groove pattern.

The groove pattern may at least partially surround the thin film transistor.

The groove pattern may be formed on at least one of the gate line and the data line.

The spacer may contact the first insulation substrate.

Still another exemplary embodiment of the present invention provides a liquid crystal display including: a first insulation substrate; a metal layer formed on the first insulation substrate and having a groove; an insulating layer at least partially covering the metal layer; a second insulation substrate facing the first insulation substrate; a spacer formed on the second insulation substrate and maintaining a distance between the first insulation substrate and the second insulation substrate; and a liquid crystal layer positioned between the first insulation substrate and the second insulation substrate. The spacer at least partially overlaps the metal layer and is positioned adjacent to the groove. A step is formed over the groove on the insulating layer.

The metal layer may be a gate conductor or a data conductor.

It is possible to provide a liquid crystal display including a spacer that can prevent a stain phenomenon due to externally-applied loads.

DETAILED DESCRIPTION OF THE EMBODIMENTS

Figure 1:
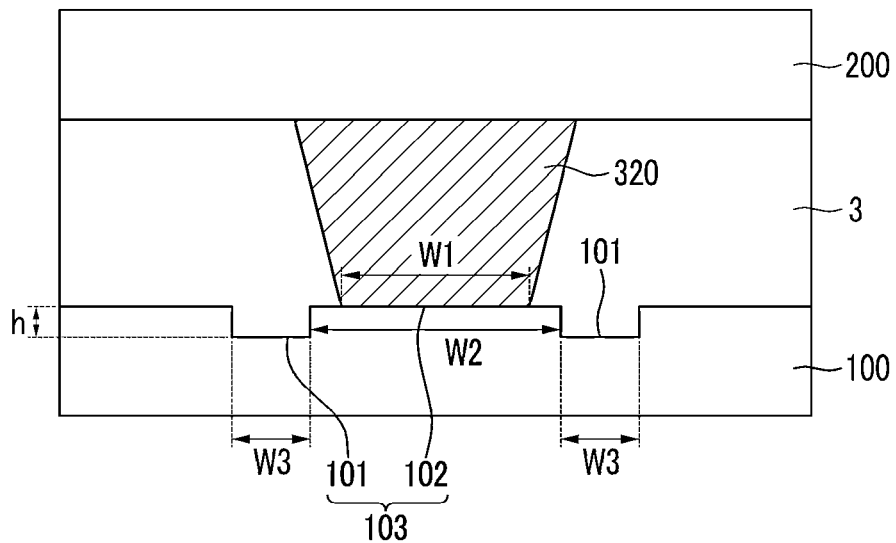
FIG. 1 is a cross-sectional view of a liquid crystal display according to an exemplary embodiment of the present invention and FIG. 2 is a top plan view of a lower panel of the liquid crystal display shown in FIG. 1.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
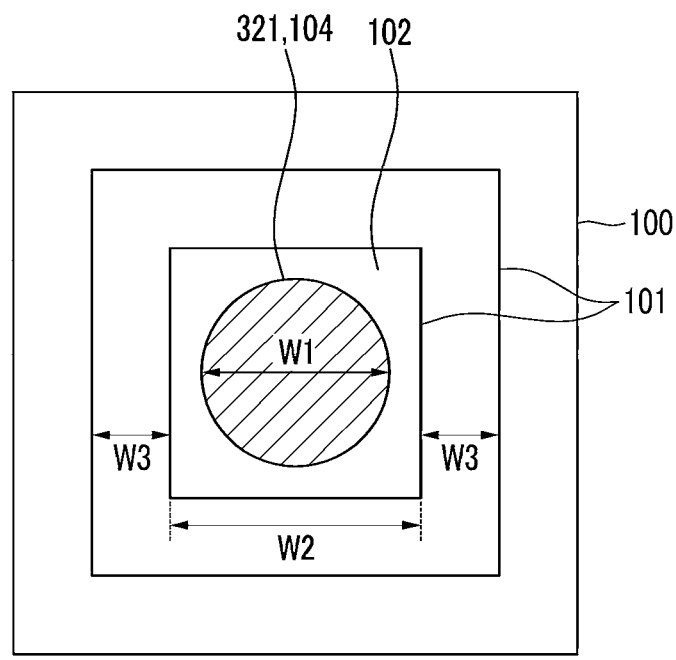

FIG. 1 is a cross-sectional view of a liquid crystal display according to an exemplary embodiment of the present invention, and FIG. 2 is a plan view of the upper face of a lower panel of the liquid crystal display shown in FIG. 1.

Referring to FIG. 1 and FIG. 2, a liquid crystal display includes a lower panel 100, an upper panel 200, and a liquid crystal layer 3 disposed between the panels.

A spacer 320 is formed on the upper panel 200. The spacer 320 has a first surface 321 facing the lower panel 100.

An opposite portion 103 of the lower panel 100 is positioned to correspond to the spacer 320. The opposite portion 103 has an opposite region 102 formed generally flat, and a groove 101 formed proximate to the opposite region 102. The groove 101 can generally define the outer boundary of the opposite region 102. The opposite region 102 has an opposite surface 104 facing the first surface 321 of the spacer 320. The groove 101 is formed to surround the opposite region 102.

The width W2 of the opposite region 102 is larger than the width (e.g., diameter) W1 of the first surface 321. That is, the area of the opposite region 102 is larger than the area of the first surface 321. The area of the opposite region 102 may be formed in the range of about 5 um to about 40 um.

When a vertical load is applied to the liquid crystal display, the entire first surface 321 of the spacer 320 can contact the opposite region 102. Since the opposite region 102 is flat, stress is distributed relatively evenly over the entire first surface 321. Therefore, strain of the spacer 320 due to vertical loads is minimized, in turn reducing defects due to vertical loads.

When a three-dimensional load is applied to the liquid crystal display, the upper panel 200 can slide, and the spacer 320 can move into the groove 101. In this position, the first surface 321 of the spacer 320 is positioned on both the opposite area 102 and the groove 101, such that the contact area between the first surface 321 of the spacer 320 and the opposite region 102 of the opposite portion 103 is reduced. Due to the reduction in contact area by the groove 101, more loads are applied to the spacer 320 and the spacer 320 fails to further slide. Thus, the groove 101 has a locking effect, effectively trapping the spacer 320 and preventing the spacer 320 and upper panel 200 from sliding further. The spacer 320 is kept from moving onto the active region by the locking effect of the groove 101, thus preventing damage to the alignment layer.

Simulations were conducted to determine the amount that spacers 320 of embodiments of the invention slide upon application of a two- or three-dimensional force. It has been found that, when a three-dimensional load is applied, embodiments of the invention reduce sliding by about 50% or more. In a simulation, when the groove is formed adjacent to the opposite region, as in an exemplary embodiment of the present invention, it was possible to improve sliding of the spacers by about 60% as compared with the case where a groove is not formed.

That is, it is possible to obtain the effect of preventing sliding even without increasing the number of spacers, by forming a groove adjacent to the opposite region. Since it is not necessary to increase the number of spacers, it is possible to prevent the aperture ratio from reducing.

The width W3 of the groove 101 may be smaller than the width W1 of the first surface 321. In this case, the spacer 320 cannot move entirely into the groove 101, thus preventing excessive change in the spacer's height. Therefore, a change in a cell gap is prevented, reducing or eliminating edge stains. The depth h of the groove 101 may be formed in the range of approximately 0.01 um to approximately 3 um. For example, the width W3 and the depth h of the groove 101 may be about 0.2 um and about 0.4 um, respectively.

When the first surface 321 is a circle, W1 is its diameter. When the opposite region 102 is a square, W2 is the length of one side of the opposite region 102. W3 is the width of the groove 101. The diameter W1 of the first surface 321 is smaller than the length W2 of one side of the opposite region 102, and the width W3 of the groove 101 is smaller than the diameter W1 of the first surface 321.

The shapes of the first surface 321 and the opposite region 102 shown in FIG. 2 are just examples. The first surface 321 may have various shapes, such as a circle, an ellipse, or a polygon, and the opposite region 102 may also have various shapes, such as a circle, an ellipse, or a polygon.

Figure 3:
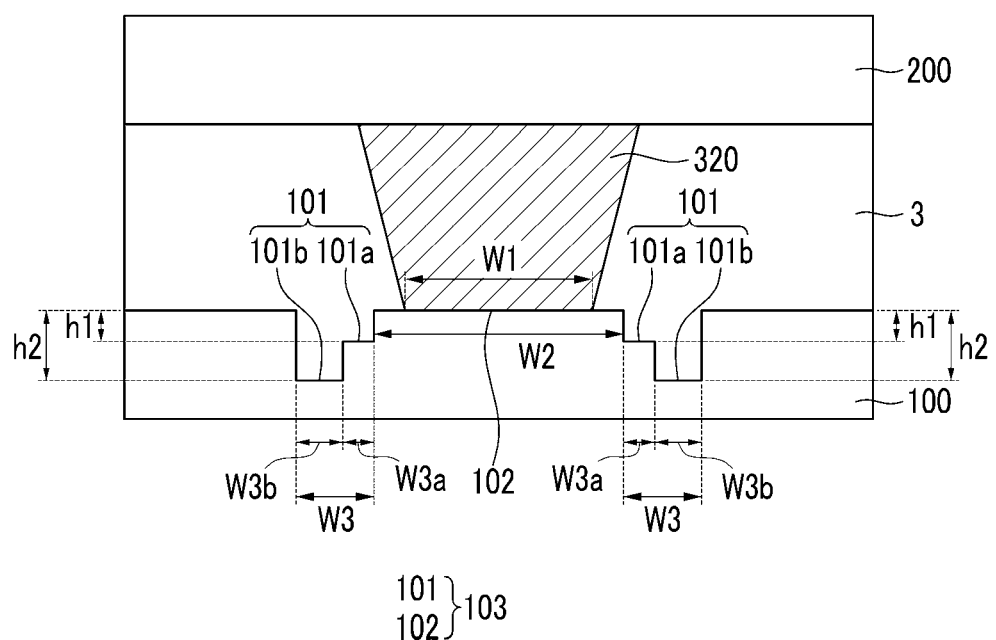
FIG. 3 is a cross-sectional view of a liquid crystal display according to another exemplary embodiment of the present invention.

FIG. 3 is a cross-sectional view of a liquid crystal display according to another exemplary embodiment of the present invention. FIG. 3 is the same as FIG. 1, except for the structure of the groove 101.

Referring to FIG. 3, the groove 101 includes a first groove 101a and a second groove 101b, which have differing depths. The first groove 101a is formed closer to the opposite region 102 than the second groove 101b. The depth h2 of the second groove 101b is formed larger than the depth h1 of the first groove 101a. The difference between the depth h1 of the first groove 101a and the depth h2 of the second groove 101b may be in the range of about 0.01 to about 3 um.

The width W3, that is the sum of the width W3a of the first groove 101a and the width W3b of the second groove 101b, may be formed smaller than the width of the first surface 321 of the spacer 320.

It is possible to adjust the sliding amount of the spacer, using the double groove structure as shown in FIG. 3.

In the figures described above, the spacer formed on the upper panel is illustrated as a main spacer that is in contact with the lower panel. However, the liquid crystal display according to an exemplary embodiment of the present invention may also be applied to a sub-spacer.

Figure 4:
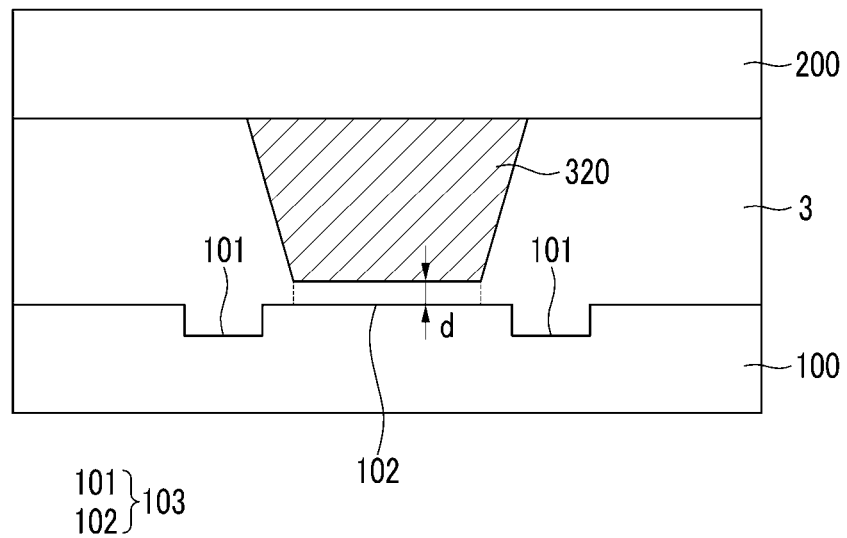
FIG. 4 is a cross-sectional view of a liquid crystal display according to another exemplary embodiment of the present invention.

FIG. 4 is a cross-sectional view of a liquid crystal display according to another exemplary embodiment of the present invention. FIG. 4 is the same as FIG. 1, except that the spacer 320 is a sub-spacer.

Referring to FIG. 4, the spacer 320 is disposed at a predetermined distance d apart from the lower panel 100. An opposite portion 103 corresponding to the spacer 320 is formed on the lower panel 100. The opposite portion 103 has an opposite region 102 formed generally flat, and a groove 101 formed adjacent to the opposite region 102.

As described above, the liquid crystal display according to an exemplary embodiment of the present invention can be applied to a main spacer and/or a sub-spacer.

Figure 5:
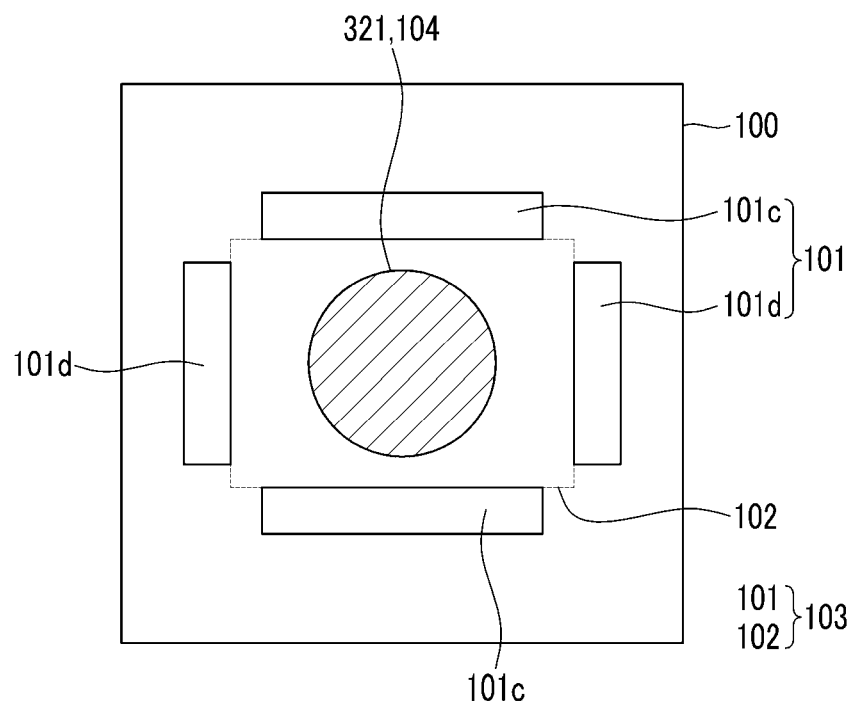
FIG. 5 and FIG. 6 are top plan views of a lower panel of a liquid crystal display according to another exemplary embodiment of the present invention.
Figure 6:
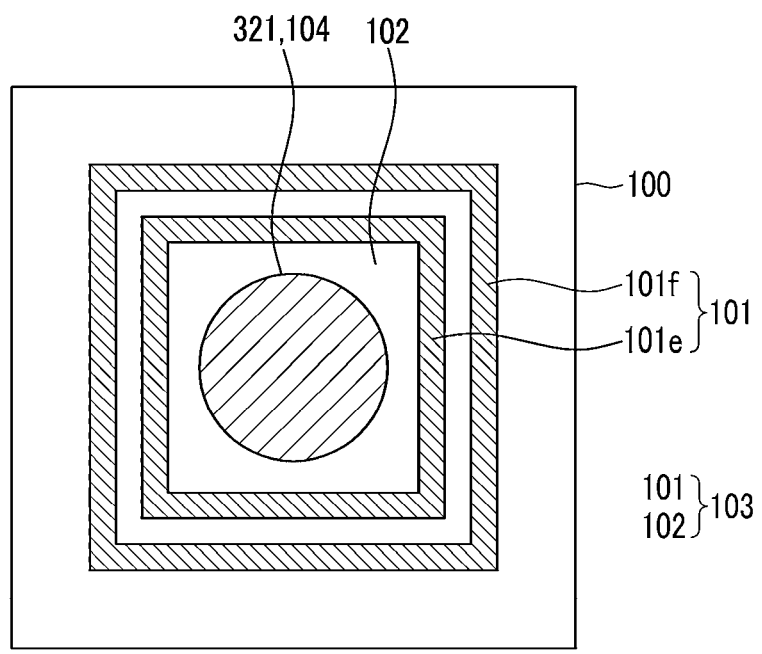

FIG. 5 and FIG. 6 are top plan views of a lower plate of a liquid crystal display according to another exemplary embodiment of the present invention. FIG. 5 and FIG. 6 are the same as FIG. 2, except for the structure of the groove 101.

Referring to FIG. 5, the groove 101 is formed adjacent to the opposite region 102, and includes grooves 101c formed above and under the opposite region 102, as well as grooves 101d formed at the left and right of the opposite region 102. In FIG. 2, the groove 101 is a single continuous groove formed to completely surround the opposite region 102, while in FIG. 5, the groove 101 is formed in segments with gaps inbetween, so as to surround portions of the opposite region 102.

Referring to FIG. 6, the groove 101 includes a plurality of grooves 101e and 101f that are separated from each other. One groove 101 is formed in FIG. 2, whereas a plurality of grooves 101e and 101f are formed in FIG. 6. Each of the grooves may have a different depth, as can the areas inbetween.

Figure 7:
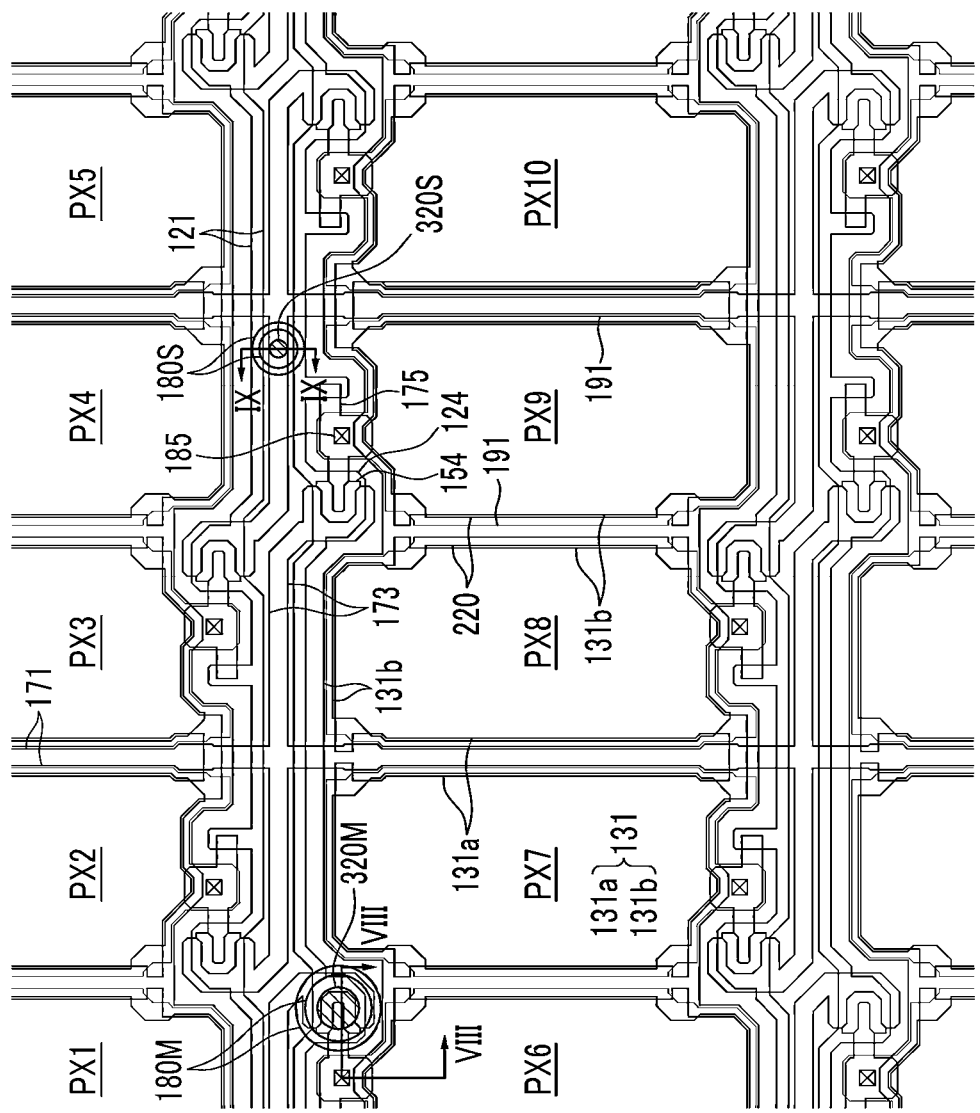
FIG. 7 is a top plan view showing a liquid crystal display according to another exemplary embodiment of the present invention.
Figure 8:
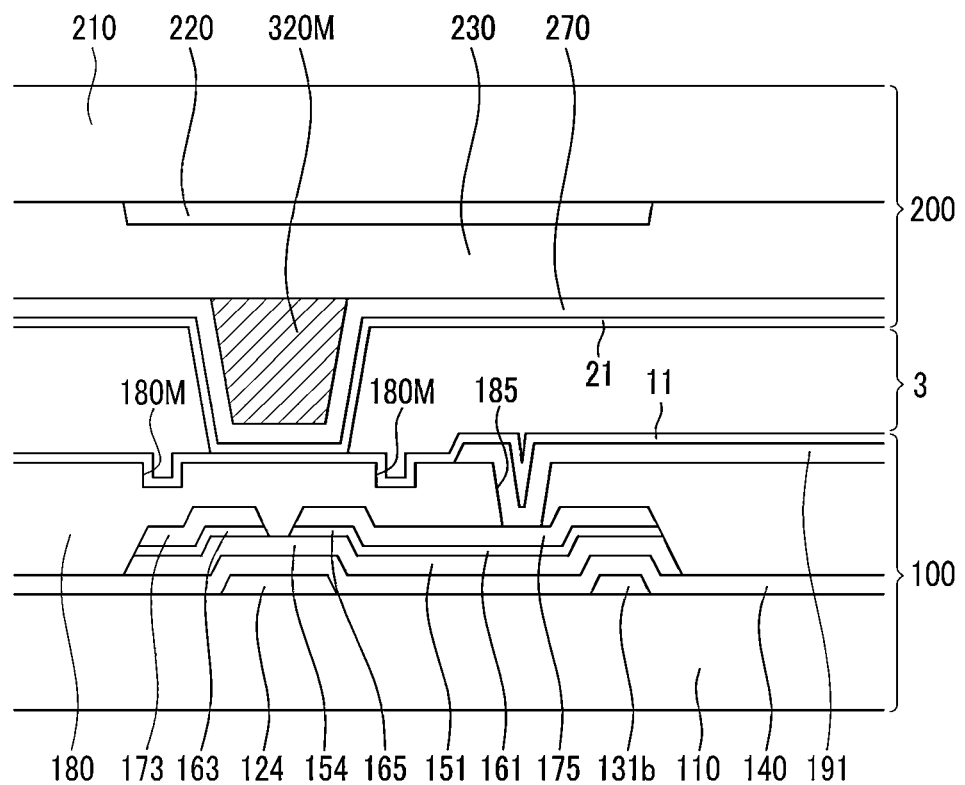
FIG. 8 is a cross-sectional view of the liquid crystal display of FIG. 7, taken along the line VIII-VIII.
Figure 9:
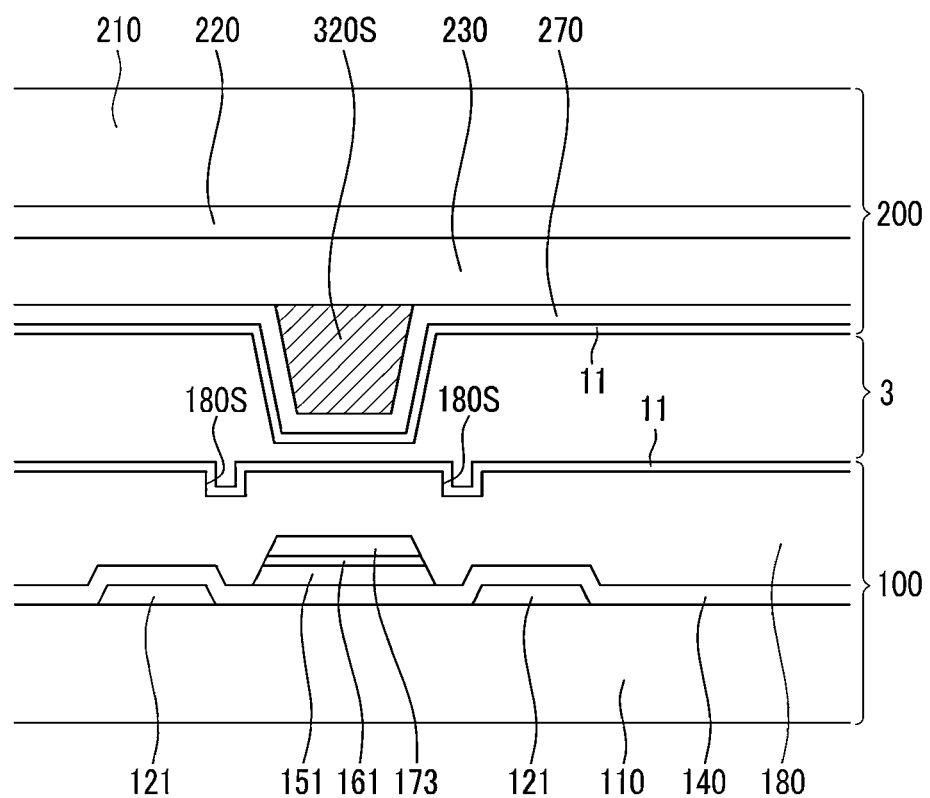
FIG. 9 is a cross-sectional view of the liquid crystal display, taken along the line IX-IX.

FIG. 7 is a top plan view showing a liquid crystal display according to another exemplary embodiment of the present invention, FIG. 8 is a cross-sectional view taken along the line VIII-VIII of FIG. 7, and FIG. 9 is a cross-sectional view of the liquid crystal display, taken along the line IX-IX of FIG. 7.

Referring to FIG. 7 to FIG. 9, the liquid crystal display includes thin film transistor array panels 100 facing each other, a common electrode panel 200, and a liquid crystal layer 3 formed therebetween.

A thin film transistor array panel 100 is described first.

The thin film transistor array panel 100 includes a first substrate 110 that is an insulation substrate, gate lines 121 and data lines 171 that intersect each other to define pixel regions on the first substrate 110, thin film transistors (TFT) connected to the gate lines 121 and the data lines 171, pixel electrodes 191 connected with the thin film transistors (TFT) in the pixel regions, and storage electrodes 131 formed at the lower portions of the data lines 171 and the edges of the pixel regions.

A gate conductor, including the gate lines 121 and the storage electrodes 131, is formed on the first substrate 110.

The gate lines 121 are formed generally along one direction on the first substrate 110, and gate electrodes 124 protrude from the gate lines 121.

Two gate lines 121 are formed between the pixels PX1-PX5 and PX6-PX10. Therefore, the gate lines 121 are formed above and under one pixel. The pixels PX2, PX3, PX7, and PX8 are connected to the upper portion of the gate line 121, and the pixels PX1, PX4, PX5, PX6, PX9, and PX10 are connected to the lower portion of the gate line 121.

The storage electrode 131 is composed of a first portion 131a overlapping the data line 171, and a second portion 131b connected to the first portion 131a and surrounding the edge of the pixel region.

A gate insulating layer 140 made of a material such as silicon nitride (SiNx) or silicon oxide ($SiO_2$) is formed on the gate line 121 and the storage electrode 131.

A semiconductor stripe 151 can be made of amorphous or crystalline silicon, and is formed on the gate insulating layer 140. The semiconductor stripe 151 has a protrusion 154 extending to the gate electrode 124. An ohmic contact stripe 161 can be made of a material such as n+ hydrogenated amorphous silicon doped with silicide or n-type impurity at high concentration, and is formed on the semiconductor stripe 151. A pair of ohmic contacts 163 and 165 is formed on the protrusion 154. The ohmic contact 163 is connected to the ohmic contact stripe 161.

A data conductor includes a plurality of data lines 171, a plurality of drain electrodes 175, and a plurality of source electrodes 173, and is formed on the ohmic contacts 161, 163, and 165.

The data lines 171 transmit data signals, and are formed to intersect the gate lines 121. Source electrodes 173 are formed to extend from the data lines 171 in the same direction as the gate lines 121, and protrude upward from the gate electrodes 124. In this configuration, the source electrodes 173 extend left and right from the data lines 171, in generally the same direction as the gate lines 121. The source electrode 173 extending leftward from the data line 171 protrudes upward from the gate electrode 124 of the upper gate line 121, while the source electrode 173 extending rightward protrudes upward from the gate electrode 124 of the lower gate line 121. Thus, the pixels PX2 and PX9 are connected to the source electrodes 173 that extend left and right from the data line 171, respectively.

Drain electrodes 175 are formed above the gate electrodes 124, at a predetermined distance from their corresponding source electrodes 173.

The thin film transistor TFT is composed of the gate electrode 124, the protrusion 154 of the semiconductor stripe 151, the source electrode 173, and the drain electrode 175.

The semiconductor stripe 151, which includes the protrusion 154, has substantially the same plane shape as the data conductors 171, 173, and 175 and the ohmic contacts 161, 163, and 165 under the data conductors, except for the channel region between the source electrode 173 and the drain electrode 175. That is, the semiconductor stripe 151, including the protrusion 154, has portions that are not covered by the data conductors 171, 173, and 175 and are exposed, in addition to the portions exposed between source electrodes 173 and the drain electrodes 175.

A passivation layer 180 is formed on the gate insulating layer 140, the data conductors 171, 173, and 175 and the exposed portion of the protrusion 154.

The passivation layer 180 provides a generally flat surface and acts as an insulating layer. A groove 180M and 180S pattern and a plurality of contact holes 185 exposing the drain electrode 175 are formed on the passivation layer 180. The depth of the groove 180M and 180S pattern may be smaller than or about the same as the depth of the contact holes 185. The grooves 180M and 180S shown in FIG. 8 and FIG. 9 do not expose the data conductors 173 and 175 or the gate insulting layer 140. The grooves 180M and 180S may be formed by additionally and selectively etching the passivation layer 180, such as by dry etching.

A pixel electrode 191 is formed on the passivation layer 180. The pixel electrode 191 is connected to the drain electrode 175 of the thin film transistor (TFT) through the contact hole 185 formed on the passivation layer 180, and receives data voltages from the drain electrode 175.

A common electrode panel 200 is described hereafter.

The common electrode panel 200 includes a second substrate 210 that is an insulation substrate, and a light blocking member 220, called a black matrix, on the second substrate 210. The light blocking member 220 is provided to prevent light leakage, and may be formed and positioned to cover the gate line 121, the data line 171, the thin film transistor (TFT), and the storage electrode 131. However, in other embodiments, the light blocking member 220 may instead be formed on the thin film transistor array panel 100.

A color filter 230 is formed on the light blocking member 220 and the second substrate 210 of the pixel. The color filter 230 is provided to implement the colors of the liquid crystal display. For example, the color filter 230 may be implemented as a repeating layout of red, green, and blue color filters 230.

A column spacer 320 is formed on the color filter 230. The spacer 320 includes a main spacer 320M overlapping the thin film transistor, and a sub-spacer 320S overlapping the source electrode 173.

A common electrode 270 is formed on the spacer 320 and the color filter 230.

A first alignment layer 11 and a second alignment layer 12 are formed on each of the inner sides of the first thin film transistor array panel 100 and the common electrode panel 200 respectively.

A liquid crystal layer 3 includes a plurality of liquid crystal molecules (not shown), and is interposed between the thin film transistor array panel 100 and the common electrode panel 200. The liquid crystal molecules in the liquid crystal layer 3 are rearranged by using an electric field generated by the common electrode 270 and the pixel electrode 191, and collectively, the layer 3 and electrodes 191, 270 implement a number of liquid crystal capacitors.

The storage electrode 131 and the pixel electrode 191 overlapping the storage electrode 131 implement a storage capacitor that assists the liquid crystal capacitor.

An opposite portion corresponding to the spacer 320 is formed at the passivation layer 180. The opposite portion includes a flat opposite region and grooves 180M and 180S formed adjacent to the opposite region. The opposite region of the opposite portion is formed larger than the area of a first surface where the spacer 320 faces the thin film transistor array panel 100. Further, the widths of the grooves 180M and 180S are smaller than the width of the first surface of the spacer 320.

Although FIG. 7 to FIG. 9 show a main spacer 320M that overlaps the thin film transistor (TFT) and a sub-spacer 320S that overlaps the data line 171, the type and position of the spacer are not limited thereto. The spacers may be formed in any area, such as a non-display area or a peripheral area of the pixel electrode. In general, the non-display area corresponds to the light blocking member 220. The spacer may be formed to overlap the thin film transistor, the data line, and/or the gate line in the non-display area.

Further, the spacer may be a main spacer or a sub-spacer, regardless of the position to be formed.

The above embodiments described grooves formed in a generally flat passivation layer. However, the invention is not limited to such configurations, and attention now turns to other embodiments.

Figure 10:
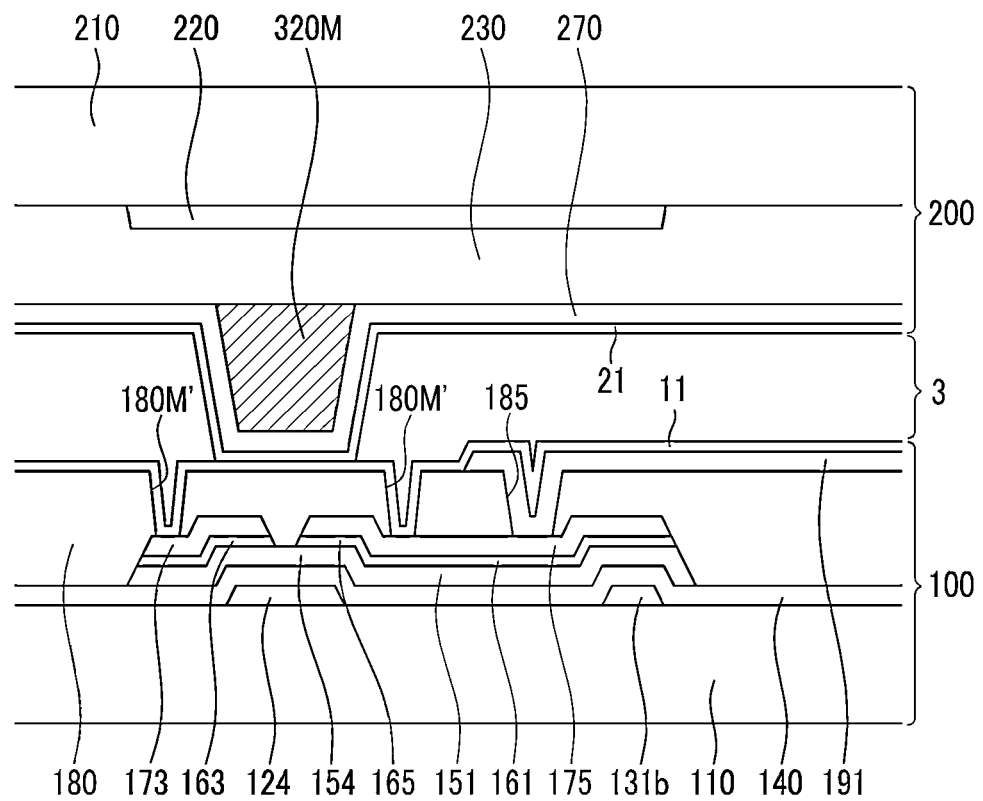
FIG. 10 and FIG. 11 are cross-sectional views of exemplary embodiments different from those shown in FIG. 8 and FIG. 9, respectively.
Figure 11:
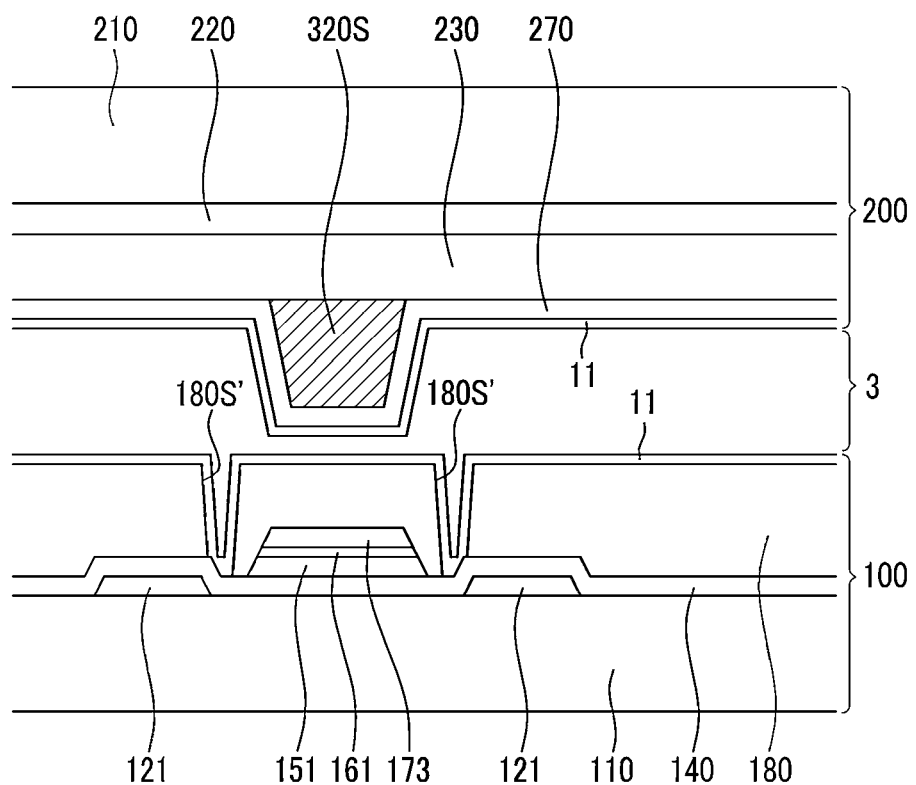

FIG. 10 and FIG. 11 are cross-sectional views according to exemplary embodiments that are different from those shown in FIG. 8 and FIG. 9, respectively. The same constituent elements as those in the exemplary embodiments shown in FIG. 8 and FIG. 9 are given the same reference numerals, and repetitive description is omitted.

Referring to FIG. 10 and FIG. 11, grooves 180M' and 180S' are formed in a passivation layer 180, and expose data conductors 173 and 175, or a gate insulating layer 140. The grooves 180M' and 180S' may be formed by etching the passivation layer 180, such as by dry etching. The grooves 180M' and 180S' can be formed by the same process as that for forming a contact hole 185, such that a separate process may not be needed.

Although FIG. 11 shows a groove 180S' that is formed only in the passivation layer 180 and that exposes the gate insulating layer 140, the groove 180S' may alternatively be formed in both the passivation layer 180 and the gate insulating layer 140 so as to expose substrate 110 or gate conductor 121.

Figure 12:
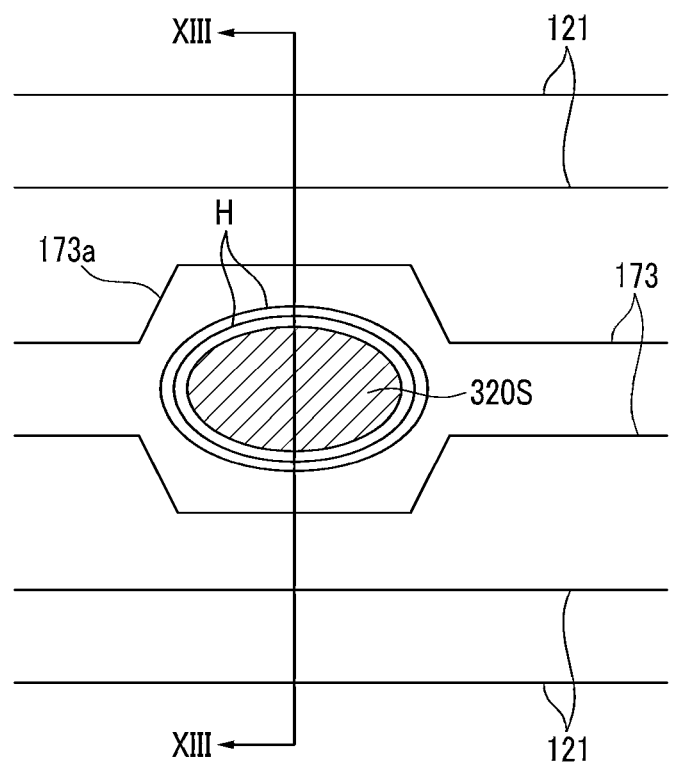
FIG. 12 is a top plan view showing another example of the portion where a sub-spacer 320S is formed in the liquid crystal display of FIG. 7
Figure 13:
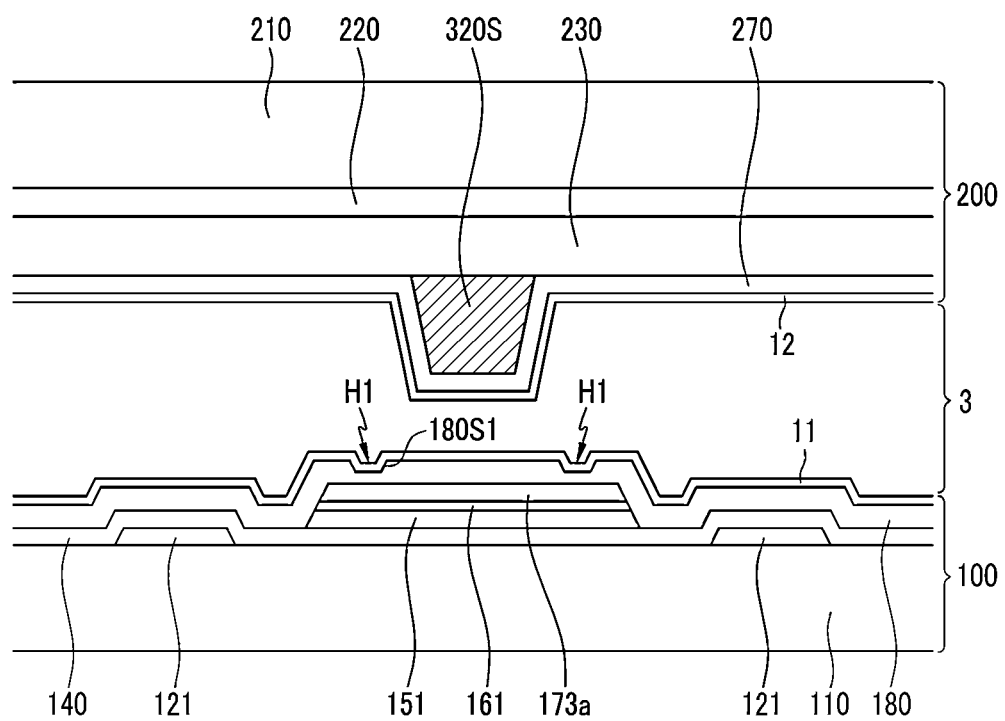
FIG. 13 is a cross-sectional view of the liquid crystal display of FIG. 12, taken along the line XIII-XIII.

FIG. 12 is a top plan view showing a configuration in which sub-spacer 320S is formed in the liquid crystal display of FIG. 7 and FIG. 13 is a cross-sectional view of the liquid crystal display of FIG. 12, taken along the line XIII-XIII. The same constituent elements as those of the exemplary embodiment shown in FIG. 9 are given the same reference numerals, and any repetitive description is omitted.

Referring to FIG. 12, the surface of the sub-spacer 320S that faces the thin film transistor array panel 100 is formed generally in an ellipse. The source electrode 173 is formed between two gate lines 121, and includes an expansion region 173a corresponding to (e.g., under) the sub-spacer 320S. Grooves H are formed adjacent to the opposite regions that face the sub-spacers 320S.

Referring to FIG. 13, the passivation layer 180 does not provide a generally flat surface, unlike FIG. 9. A groove H1 formed on the lower panel 100 is formed by forming a groove 180S1 on the passivation layer 180. The groove 180S1 does not extend all the way through the passivation layer 180, and thus does not expose the data conductor 173a under the groove 180S1. The groove 180S1 can be formed by additionally and selectively etching the passivation layer 180, such as by dry etching.

Figure 14:
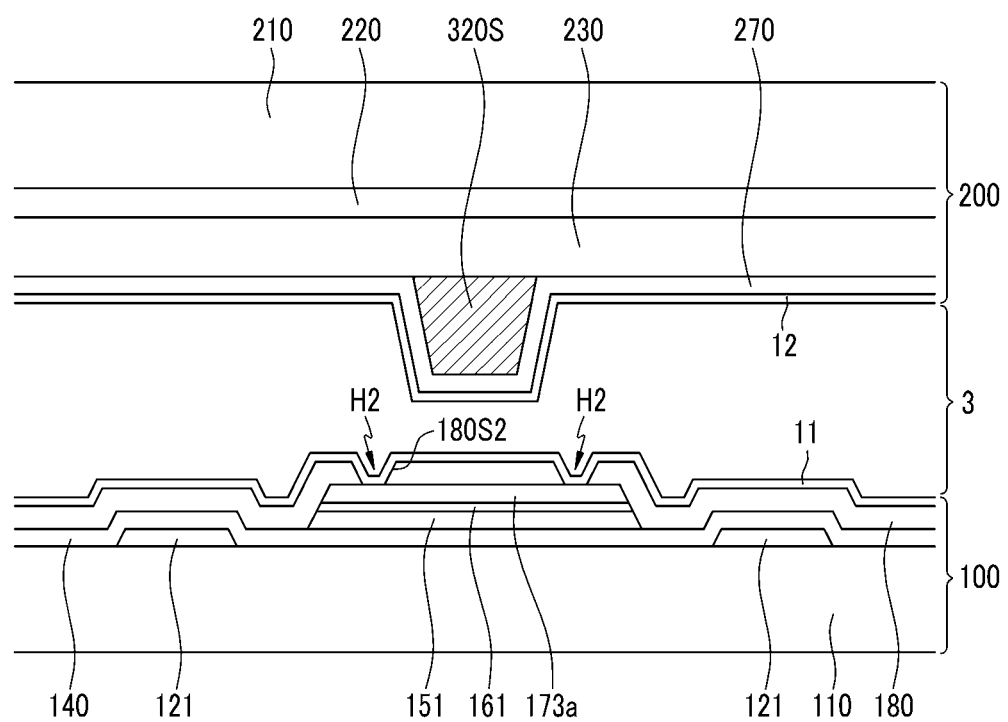
FIG. 14 to FIG. 16 are cross-sectional views of an embodiment different from that of FIG. 13.
Figure 15:
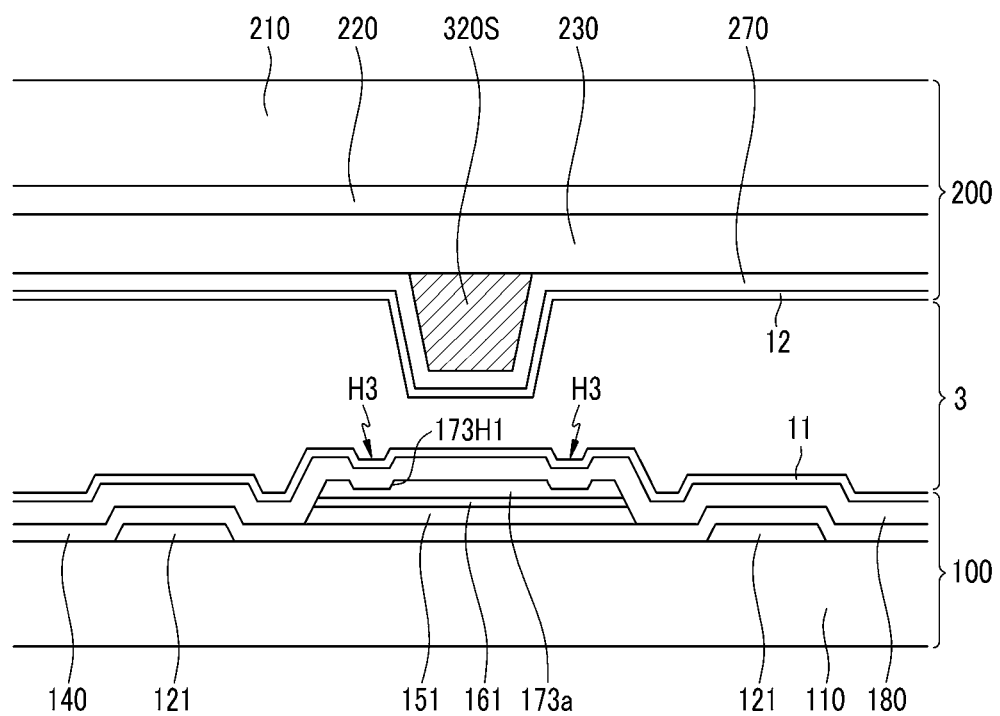
Figure 16:
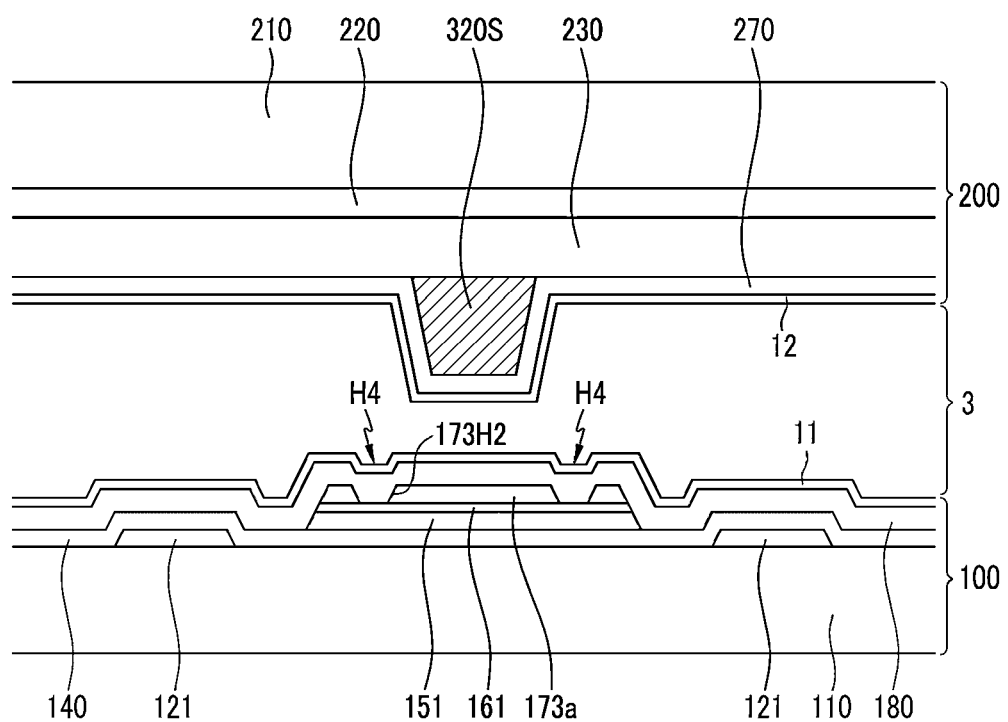

FIG. 14 to FIG. 16 are cross-sectional views according to exemplary embodiments different from those shown in FIG. 13. The same constituent elements as those of the embodiment shown in FIG. 13 are given the same reference numerals, and any repetitive description is omitted.

Referring to FIG. 14, a groove H2 is formed by forming a groove 180S2 on the passivation layer 180. The groove 180S2 exposes the data conductor 173a, unlike in FIG. 13. The groove 180S2 can be formed by the same process as that for forming a contact hole (see reference numeral 185 of FIG. 10), such that a separate process may not be required.

Referring to FIG. 15, a groove H3 is formed by forming a groove 173H1 on the data conductor 173a. The groove 173H1 does not extend through the data conductor 173a, and thus does not expose the ohmic contact 161. The groove 173H1 forms a step or channel-like depression on the passivation layer 180 and the alignment layer 11, such that the groove H3 is formed. The groove 173H1 may be formed by additionally and selectively etching the data conductor 173a, such as by wet etching.

Referring to FIG. 16, the groove H4 is formed by forming a groove 173H2 on the data conductor 173a. The groove 173H2 exposes the ohmic contact 161, unlike in the embodiment of FIG. 15. Even though the groove 173H2 is formed to expose the ohmic contact 161, referring to FIG. 12, the source electrode 173 includes expanding region 173a, such that the source electrode 173 is not disconnected.

Although FIG. 16 shows a groove 173H2 that is formed only through the data conductor 173a to expose the ohmic contact 161, the groove 173H2 may alternatively be formed through both the data conductor 173a and the ohmic contact 161, so as to expose the semiconductor stripe 151.

As described above, the groove for preventing the spacer from sliding may be formed at the passivation layer or the data conductor. Additionally, the groove may be formed not only on the data conductor, but also on a metal layer, such as the gate conductor. The groove formed on the passivation layer or the metal layer may extend only partially through these layers, or may extend completely through, so as to expose another layer formed under the passivation layer or the metal layer.

Figure 17:
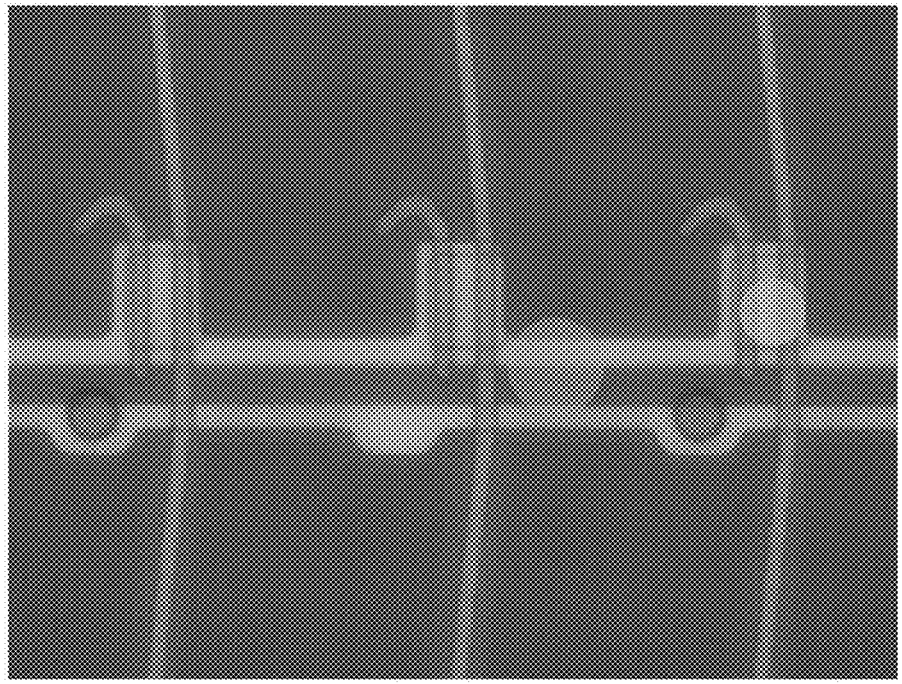
FIG. 17 and FIG. 18 are top plan views showing a liquid crystal display according to another exemplary embodiment of the present invention.
Figure 18:
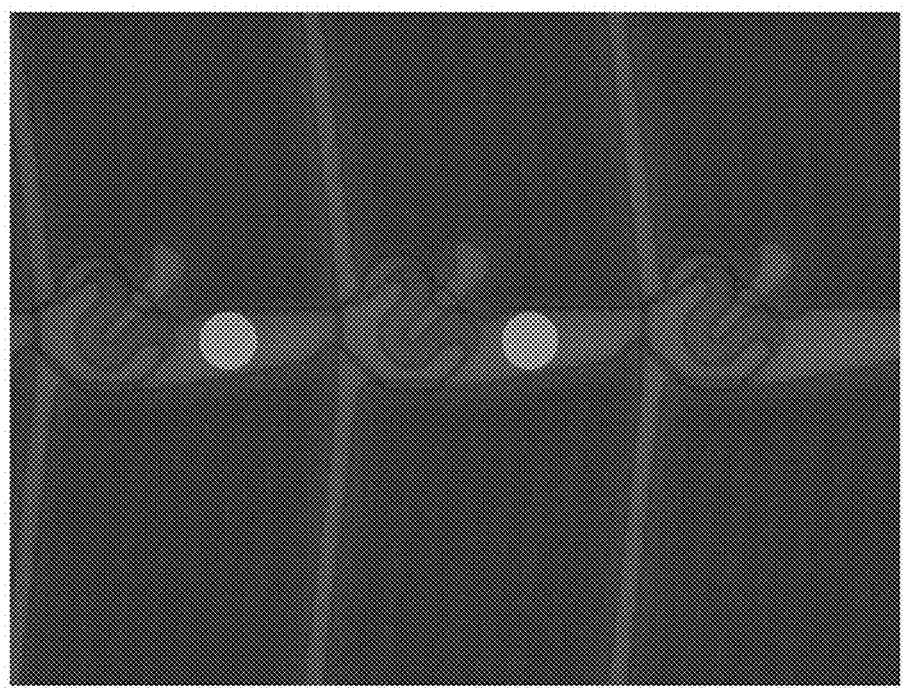

FIG. 17 and FIG. 18 are top plan views showing a liquid crystal display according to another exemplary embodiment of the present invention.

The liquid crystal display shown in FIG. 17 includes a spacer overlapping a thin film transistor (TFT), and a spacer overlapping a gate line. The liquid crystal display shown in FIG. 18 includes a spacer overlapping a gate line.

Therefore, it is possible to provide a liquid crystal display including a spacer that can prevent a stain phenomenon that occurs due to externally-applied loads.

It is possible to more uniformly distribute the vertical load upon the spacer, and to minimize strain of the spacer, by flattening the spacer face closest to its opposing substrate. Further, it is possible to prevent the spacer from sliding due to external loads, by forming a groove in the opposing substrate and proximate to the spacer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate and a second substrate, the second substrate being disposed opposite to the first substrate;
a liquid crystal layer positioned between the first substrate and the second substrate; and
a spacer formed between the first substrate and the second substrate, the spacer contacting a first region of the first substrate and a second region of the second substrate,
wherein the first substrate has a groove including a first groove surrounding an outer boundary of the spacer and a second groove surrounding the first groove, and
wherein the first groove surrounds the first region of the first substrate and the second groove surrounds the second region of the second substrate, and widths of the first region and the second region are larger than a width of the spacer.

2. The liquid crystal display of claim 1, wherein the first groove and the second groove have different depths.

3. The liquid crystal display of claim 2, wherein the first groove is shallower than the second groove.

4. The liquid crystal display of claim 3, wherein a difference in depth between the first groove and the second groove ranges from about 0.01 µm to about 3 µm.

5. The liquid crystal display of claim 2, wherein a width of the groove is smaller than a width of the first region.

6. The liquid crystal display of claim 5, wherein the first groove is shallower than the second groove.

7. The liquid crystal display of claim 6, wherein a difference in depth between the first groove and the second groove ranges from about 0.01 µm to about 3 µm.

8. The liquid crystal display of claim 5, wherein the first groove and the second groove are connected to each other.

9. The liquid crystal display of claim 8, wherein the first groove is shallower than the second groove.

10. The liquid crystal display of claim 9, wherein a difference in depth between the first groove and the second groove ranges from about 0.01 µm to about 3 µm.

11. The liquid crystal display of claim 2, wherein the first groove and the second groove are connected to each other.

12. The liquid crystal display of claim 11, wherein the first groove is shallower than the second groove.

13. The liquid crystal display of claim 12, wherein a difference in depth between the first groove and the second groove ranges from about 0.01 µm to about 3 µm.

14. The liquid crystal display of claim 1, wherein a width of the groove is smaller than a width of the first region.

15. The liquid crystal display of claim 14, wherein the first groove and the second groove are connected to each other.

16. The liquid crystal display of claim 15, wherein the first groove is shallower than the second groove.

17. The liquid crystal display of claim 16, wherein a difference in depth between the first groove and the second groove ranges from about 0.01 µm to about 3 µm.

18. The liquid crystal display of claim 1, wherein the first groove and the second groove are connected to each other.

19. The liquid crystal display of claim 18, wherein the first groove is shallower than the second groove.

20. The liquid crystal display of claim 19, wherein a difference in depth between the first groove and the second groove ranges from about 0.01 µm to about 3 µm.

* * * * *